United States Patent [19]

Brown

[11] Patent Number: 4,685,231

[45] Date of Patent: Aug. 11, 1987

[54] PHOTOGRAPHIC DISC VIEWER

[76] Inventor: Donnamae J. Brown, 90361 Shadows Dr., Springfield, Oreg. 97478

[21] Appl. No.: 776,566

[22] Filed: Sep. 16, 1985

[51] Int. Cl.$^4$ .............................................. G02B 27/02
[52] U.S. Cl. ...................................... 40/366; 40/362
[58] Field of Search .................. 40/366, 367, 362, 495

[56] References Cited

U.S. PATENT DOCUMENTS

| | | | |
|---|---|---|---|
| 1,685,584 | 9/1928 | Dean | 40/361 |
| 2,713,015 | 7/1955 | Paulsohn | 40/361 |
| 3,026,640 | 3/1962 | Ogdon | 40/362 |
| 3,170,259 | 2/1965 | Frye | 40/367 |
| 3,174,241 | 3/1965 | Rohan | 40/367 |

Primary Examiner—Gene Mancene
Assistant Examiner—Wenceslao J. Contreras
Attorney, Agent, or Firm—James D. Givnan, Jr.

[57] ABSTRACT

The viewer includes a main body defining a horizontal opening within which a photographic disc is rotatably supported. A light source below the horizontal opening projects the viewed image onto a magnifier lens located above the opening. A viewing port renders the image identifying number on the disc visible. A switch control automatically closes a switch upon grasping of the handgrip portion of the main body. The control is inherently biased to a switch opening position.

5 Claims, 2 Drawing Figures

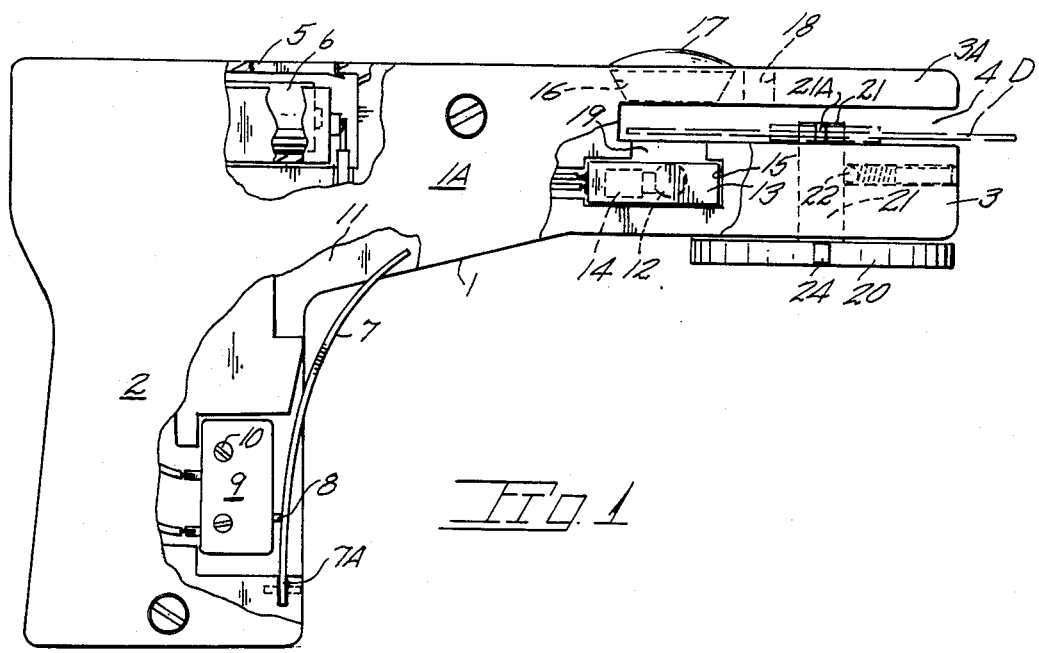
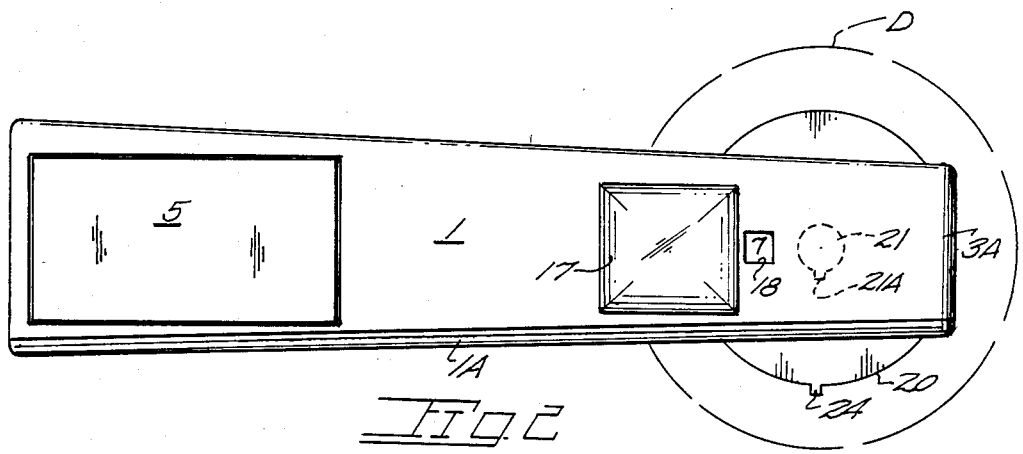

PHOTOGRAPHIC DISC VIEWER

BACKGROUND OF THE INVENTION

The present invention pertains generally to devices for viewing photographic transparent images and more particularly to such a device which rotatably mounts the viewed disc.

The small size of the photographic images on a disc of the type used in conjunction with so-called disc cameras are quite small and render the selection of transparencies for reprints difficult. The photographic images are approximately 1/2 inch square and require the use of a magnifying glass particularly when a great number of the images are similar such as of the same subject. Additionally, photographic discs bear numbers each identified with a photographic image.

While illuminated viewers are old in the viewer art as are viewers providing magnification of an image, the prior art to the extent known, is not directed toward solving the problems encountered in identifying disc images.

U.S. Pat. No. 2,583,510 shows a slide viewer in the configuration of a handgun wherein a trigger actuates a slide carrier. U.S. Pat. No. 2,467,014 discloses a viewer with a ratchet assembly for rotating a circular slide holder.

SUMMARY OF THE PRESENT INVENTION

The present invention is embodied in a photographic viewing device within which may be rotatably mounted an image bearing disc of the type associated with disc cameras.

A turntable is provided which rotatably carries the disc so as to position in sequence the images theron between a light source and a magnifying lens. Indexing means retain the turntable against all but desired rotation. A light source is housed within the device in a removable manner to permit servicing of the light source. Adjacent the magnifying lens of the device is a viewing port disposed above that area of the disc on which a number is displayed so that the user may readily identify a viewed image. Switch means are disposed within the device to facilitate closure of a circuit to the lingt source upon grasping of a handgrip of the device. A battery compartment is readily accessible for replacement purposes.

Important objectives include the provision of a photographic disc viewer lending itself to low cost manufacture to make the viewer attractive to individuals as well as photography stores for use by customers when ordering reprints; the provision of a viewing device the operation which is readily apparent to perment cusotmers at photography counters to use such a device without a detailed explanation by the clerk being necessary; the provision of a viewing device wherein components requiring servicing are readily accessible for such purposes.

BRIEF DESCRIPTION OF THE DRAWINGS

In the accompanying drawing:

FIG. 1 is a front elevational view of the present viewing device with fragments broken away for purposes of illustration; and FIG. 2 is a top plan view of FIG. 1.

DETAILED DESCRIPTION OF THE PREFERRED EMBODIMENTS

With continuing reference to the drawings wherein applied reference numerals indicate parts similarly hereinafter identified, the reference numeral 1 indicates the main body of the present device which may take the general shape of a pistol which contributes to its convenient use. A side plate at 1A closes the main body.

Main body 1 includes a handgrip portion 2 and a forwardly projecting portion 3 which is bifurcated at 4 to provide a horizontally disposed open area. Immediately above said open area is an elevated portion 3A of the main body.

A closure 5 overlies a power source which may be a pair of batteries 6 such as those designated as "AA" cell of 1.5V each.

Switch means includes a finger actuated control 7 disposed in the nature of a trigger and having a stationary end 7A confined within a slot formed in the main body. Movement of the control inwardly serves to actuate the pin or button 8 to close contacts within a switch body 9 mounted in place within the main body by fasteners 10. An open area 11 within the main body permits movement of the distal end of control 7.

A light source is embodied within a bulb 12 confined within a housing 13 by means of a socket 14. Housing 13 is removable from a main body open area 15 for purposes of bulb replacement. A second open area 19 immediately above the light source permits illumination of that annular portion of the disc D which carries the photographic transparencies. An opening at 16 in the main body portion 3A permits viewing of the image through a magnifier lens 17.

A viewing port at 18 in main body portion 3A permits the user to identify the viewed image by noting the disc carried number associated with the image viewed. Turntable means include a fingertip wheel 20 carried by a rotatably mounted post 21 which terminates upwardly within disc receiving opening 4. The post is provided with a key 21A engageable with a keyway conventionally provided within the photographic discs to provide positive driving engagement between the post and disc.

An indexing arrangement includes a spring biased ball 22 which seats within post recesses (not shown) to prevent inadvertent rotation of the post and disc.

A power source in the form of the above mentioned batteries is readily accessible via closure 5. If desired, the battery may be housed with a tray which is removable from the main body to facilitate battery replacement.

In use the disc D bearing a circular array of transparencies is inserted into opening 4 and rotated until it seats on the post. For convenience sake an indicator 24 on the disc 20 is provided to indicated the position of post key 21A. Upon the figer actuated control 7 being displaced inwardly toward switch 9, a circuit is completed to the light source to illuminate, from below, the photographic transparency above opening 15. Control 7 is inherently biased outwardly to assure opening of internal switch contacts when the device is released. Upon incremental rotation of disc D by rotation of fingertip wheel 20 a new image will be viewed through lens 17 and the identifying number through viewing port 18.

While I have shown but one embodiment of the invention, it will be apparent to those skilled in the art that the invention may be embodied still otherwise without departing from the spirit and scope of the invention.

Having thus described the invention, what is desired to be secured in a Letters Patent is:

I claim:

1. A device for viewing photographic transparent images annularly disposed upon a disc, said device comprising, a main body defining a horizontal open area for receiving the disc and having a handgrip portion, turntable means including a post offset from said handgrip portion and on which the disc may be placed.

a light source disposed within said main body below the horizontal open area, a magnifier lens disposed above main body open area through which may be viewed a disc photographic image, means permitting viewing of the disc and particularly an annular area on which numbers are displayed with each number associated with an image.

a power source, switch means on said handgrip portion in circuit with said power source and said light source, said switch means including a manually activated control, and an electric circuit including said power source, said light source and said switch means whereby upon closure of said switch means the light source provides illumination to a disc carried image.

2. The device claimed in claim 1 wherein said turntable means includes a fingertip wheel carried by said post.

3. The device claimed in claim 2 wherein said post includes a key for engagement with a keyway in the disc, said fingertip wheel including an indicator indicating the position of the key mounted post.

4. The device claimed in claim 1 wherein said control is a flexible member, said switch means including a switch having a button actuated by said member, said flexible member normally protruding from said handgrip portion offset from said switch button.

5. The device claimed in claim 1 wherein said light source includes a bulb housing removably mounted in said main body, said main body including a side plate normally confining said bulb housing in place.

* * * * *